(12) United States Patent
Reinhardt et al.

(10) Patent No.: US 6,568,526 B1
(45) Date of Patent: May 27, 2003

(54) STACKABLE COMPACT DISK CASE

(75) Inventors: Peter Reinhardt, Marietta, GA (US); Masaru Ikebe, Tokyo (JP); Kimitoshi Itou, Tokyo (JP); Blaise Bertrand, Palo Alto, CA (US); Robert Stancel, Palo Alto, CA (US); James Yurchenco, Palo Alto, CA (US)

(73) Assignee: TDK Electronics Corporation, Port Washington, NY (US)

( * ) Notice: Subject to any disclaimer, the term of this patent is extended or adjusted under 35 U.S.C. 154(b) by 0 days.

(21) Appl. No.: 09/550,390

(22) Filed: Jan. 31, 2000

Related U.S. Application Data

(63) Continuation-in-part of application No. 29/108,451, filed on Jul. 27, 1999.

(51) Int. Cl.[7] .............................................. B65D 85/30
(52) U.S. Cl. .................. 206/310; 206/308.1; 211/41.12
(58) Field of Search ............................ 206/310, 308.1, 206/505; 211/41.12

(56) References Cited

U.S. PATENT DOCUMENTS

| | | | | |
|---|---|---|---|---|
| 4,972,951 A | * | 11/1990 | Vartanian | 206/387.1 |
| 5,238,107 A | * | 8/1993 | Kownacki | 206/308.1 |
| 5,341,924 A | * | 8/1994 | Morrone | 206/310 |
| 5,529,182 A | * | 6/1996 | Anderson et al. | 206/308.1 |
| 5,551,560 A | * | 9/1996 | Weisburn et al. | 206/310 |
| 5,573,120 A | * | 11/1996 | Kaufman et al. | 206/310 |
| 5,785,172 A | * | 7/1998 | Bolognia et al. | 206/308.1 |

FOREIGN PATENT DOCUMENTS

FR 2627890 A * 9/1989 ................ 206/308.1

* cited by examiner

*Primary Examiner*—Mickey Yu
*Assistant Examiner*—Troy Arnold
(74) *Attorney, Agent, or Firm*—Darby & Darby

(57) ABSTRACT

The disk storage case is composed of a circular setting portion for setting the disk-like member such as a compact disk thereon, a disk holding portion for holding the disk-like member vertically and annularly arranged at a center of a setting face of the setting portion, and a through hole provided at inner side of the annular holding portion. The disk storage case has a simple structure and a lightweight. A plurality of disk storage cases storing the compact disks and others can compactly be stacked and packaged, and by insertion of the cylindrical rod into the through hole and by packing with film, it may easily be packaged without tilting, and the package of a plurality of the disk storage cases can be produced simply and effectively.

12 Claims, 7 Drawing Sheets

STACKABLE COMPACT DISK CASE

This application is a continuation-in-part of U.S. design application Ser. No. 29/108,451, filed Jul. 27, 1999.

BACKGROUND OF THE INVENTION

1. Field of the Invention

The present invention relates to a disk storage case suitable to store and preserve a disk-like information recording medium such as CD, CD-R, CD-RW, CD-ROM, MO, MD DVD and the like, to a package of the disk storage cases plurally stacked and packaged, and to a production method of the package.

2. Description of the Prior Art

Conventionally, when a disk such as a compact disk (CD) is stored, jewel case has been used, consisting of three parts of body, cover and tray. Recently, the case consist of a cover and a body and having nails on the body to hold the disk, which is of the simplified jewel case, or the case in which a plurality of disks put in an envelope made of nonwoven fabric or others are stored in a large plastic case, are being commercialized.

However, the conventional jewel case is composed of three parts and a weigh comes to 65 to 70 grams. Accordingly, it is inconvenient for handling because of its heavy weight when a plurality of disks are carried out, and production cost comes to high.

The intention to provide the case consisting of cover and body is to make them lighter weight and more compact size and a cost reduction due to making a thin jewel case. However, since it is composed of the cover and the body, the weight comes to approximately 45 grams, and furthermore, polystyrene is generally used for a material, and since it has a shaft and a shaft hole to correct the cover to the body, there is a problem that the case will easily be broken by falling impact or others.

In case of the envelopes of nonwoven fabric and a case for storing them, as it is insufficient to protect the disks only with the envelope of nonwoven fabric, a case is necessary to store them. Accordingly, for commercializing, a plastic case or paper box such as a case for ten disks or that for twenty disks has to be prepared depend upon the number of disks to be stored and many of cases or paper boxes are to be provided for production. When they are to be carried, unnecessary disks are also to be carried coincidentally since a unit to carry is to be a case. In addition, the envelope will not be transparency because of using the nonwoven fabric, and it will require time to find the necessary disk.

There are lots of forms to sell a plurality of recordable compact disks (products called as CD-R or CD-RW) together. In this case, if the jewel case or the case consisting of two parts, cover and body, is used, it will have a formation to additionally be wrapped together with the paper box or the film. However, in such case, the package size will come to large in proportion to the number of disks, and the weight will also come to much heavy.

Furthermore, when a plurality of storage cases are wrapped together with a film and subjected to heat shrinkage by hot air, it is difficult to heat up uniformly, and accordingly, the package is sometimes tilted due to lack of uniformity of film shrinkage.

SUMMARY OF THE INVENTION

It is a primary object of the present invention to provide a disk storage case in which a disk-like member such as compact disk may easily be stored, which may be lightweight and a plurality of the disk storage case may compactly be stackable and packaged easily.

It is another object of the present invention to provide a production method of a package and the package, which may easily be produced by stacking a plurality of disk storage cases in which the disk-like members such as compact disks are stored.

A disk storage case according to the present invention is composed of a circular setting portion for setting a disk-like member thereon, a disk holding portion for holding the disk-like member arranged vertically and annularly at a center part of the setting face of the setting portion, and a through hole provided at an interior of the annular holding portion. According to the disk storage case, the disk storage case which is a simplified and lightweight can be realized, a plurality of the disk storage cases in which the disk-like members such as the compact disks are stored, can be stacked compactly for packaging, and the packaging can easily be made without tilting by insertion of a cylindrical rod into the through hole and film packing.

In addition, a disk storage case according to claim 1, wherein a first fitting portion is provided at an exterior of the setting portion, a second fitting portion in which the first fitting portion is capable of being fitted, is provided at a back face of the setting face, and when a plurality of the disk storage cases are stacked, the first fitting portion is fitted in the second fitting portion of the adjacent disk storage case whereby the plurality of disk storage cases can be connected each other without fail when they are packaged. The first fitting portion may be arranged on the stepped portion formed at an exterior face of the setting face, and the second fitting portion may be arranged as a projection formed at the back face of the setting face. It is preferable to provide the setting portion slightly more than a diameter of the disk-like member.

By provision that a distance between the setting face and the back face of the setting face of the adjacent disk storage case is more than a thickness of the disk-like member, it makes a possibility to store the disk-like member in a space between the setting face and the back face of the setting face of the adjacent disk storage case. In this case, it is preferable to provide the projections on the setting face so as to prevent an entire face of the disk-like member from contacting the setting face.

By further provision of a grip portion extending from a circumference of the circular portion so that the disk storage case may be gripped, it will make an expedient to store and use the disk storage cases. The grip portion may be provided at the circumference of the setting portion partially or separately. By further provision of a hook portion formed by notching a part of the grip portion so that the disk storage cases may be hung, it will make an expedient to keep the disk storage cases.

It can be made easy to take out the disk-like member from the disk storage case by provision of an easy deformable portion in the setting portion so that a part of the setting face is easily deformed by pushing the back face with a finger.

A production method of a package according to the present invention, in which a plurality of disk storage cases are packaged, includes a step of providing a pedestal to which a rod-like member is fixed, a step of storing a disk-like member in a disk storage case mentioned above, a step of putting a plurality of disk storage cases stacked on the pedestal by inserting into the rod-like member, a step of winding a heat shrinkable film around the plurality of disk storage cases stacked, a step of heating up the heat shrinkable film wound around the plurality of disk storage cases, and a step of removing the plurality of disk storage cases inserted into the rod-like member and stacked, from the rod-like member fixed on the pedestal.

According to the production method, since a plurality of disk storage cases are stacked on the pedestal with inserting onto the rod-like member through the through hole, there is no case to make moving from the set up location. Due to this condition, it comes to make it easy to wind a heat shrinkable film around a circumference of a plurality of disk storage cases stacked, and furthermore, it can make no failure that the package is tilted even if a shrinkage is not uniformly made due to lack of uniformity of the supplied hot air when the heat shrinkage film is heated by the hot air. Accordingly, the package can effectively be produced, in which a plurality of disk storage cases are stacked and packaged.

When a plurality of the disk storage cases are to be stacked prior to the packaging, the plurality of cases may be put on the pedestal with inserting into the rod-like member after they are stacked, or, a plurality of disk storage cases may also be put on the pedestal to pile up with slipping onto a rod-like member one by one through a through hole.

It is preferable to be that a diameter of the pedestal is less than a maximum diameter of the disk storage case. Due to the above, a film may be wound around a circumference of the adjacent disk storage case without fail. In this case, a spacer member whose diameter is less than a maximum diameter of the disk storage case, can be arranged on the pedestal.

The package in which the plurality of disk storage cases are packaged according to the present invention is, by production method mentioned above, provided so that a plurality of the disk storage cases storing the disk-like members are packaged with the heat shrinkable film.

By this packaging, it may be realized to make a package in which the plurality of disk storage cases are stacked and packaged without tilting.

In this case, the disk-like member is not stored in the disk storage case put on top of the package, whereby it is not necessary in particular to provide a protection member for protecting the disk-like member stored in the top disk storage case, and it is profitable for cost, accordingly.

It is preferable to be that the disk-like member is an information recording medium, and it is more preferable to be of CD-R or CD-RW.

DETAILED DESCRIPTION OF THE PREFERRED EMBODIMENTS

Figure 1:
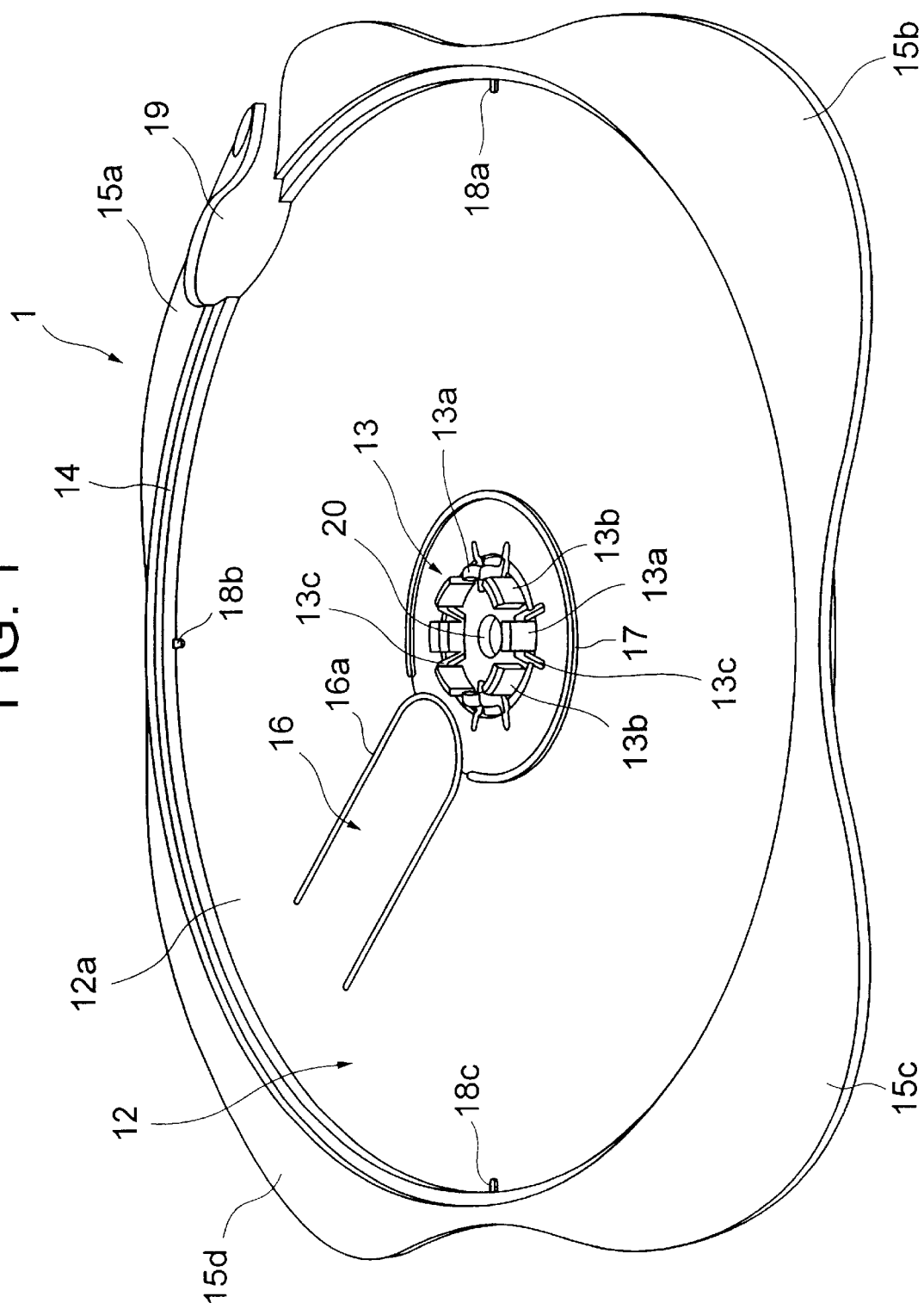
FIG. 1 is a perspective view showing a disk storage case in an embodiment of the present invention.

Embodiments of the present invention will hereinafter be described with reference to the accompanying drawings. As illustrated in FIG. 1A and FIG. 2A to FIG. 3B, a disk storage case 1 in accordance with the embodiments, is formed like a tray as a hole made of thin plate, and is composed of a setting portion 12 having the circular setting face 12a of which a diameter is slightly more than that of the compact disk so as to set it thereon, a disk holding portion 13 into which a center hole of the compact disk is fitted to hold the compact disk, a through hole 20 provided at a center of inner side of the disk holding portion 13, a stepped portion 14 provided circularly at an exterior of the setting face 12a, grip portions 15a, 15b, 15c and 15d provided so as to extend form a circumference of the stepped portion 14 and, formed individually like a petal, and a deformable portion 16 provided on setting face 12a, which may easily be deformed by pushing with finger due to the through groove 16a provided to extend in radius direction in a form as letter-U.

Grip portions 15a to 15d are provided in order to be able to grip the disk storage case 1 during handling, and divided into four (4) in a circumferential direction. A hooking part 19 is formed by notching a part of a grip portion 15a which is one of the grip portions, and the disk storage case 1 may be suspended with the hooking portion 19. Grip portions 15a to 15d are, as illustrated in FIG. 1, FIG. 2B and FIG. 2C, curved gradually toward the back face 12b of the setting portion 12.

Figure 2A:
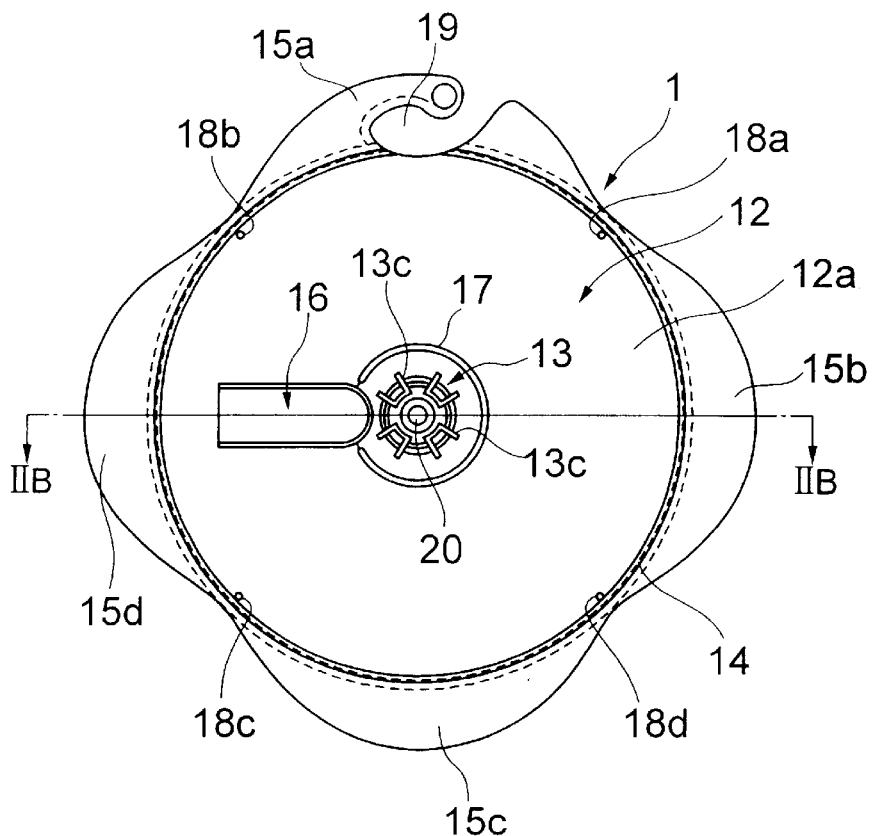
FIG. 2A is a plan view showing a disk storage case in FIG. 1.
Figure 2B:
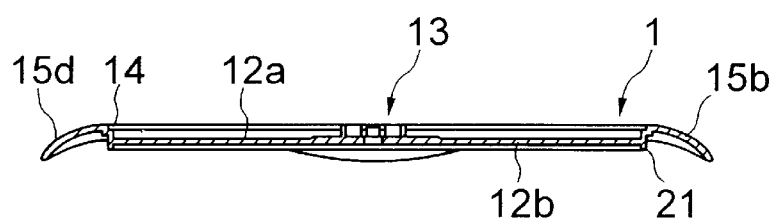
FIG. 2B is a sectional view taken along the line IIB—IIB in FIG. 2A.
Figure 2C:
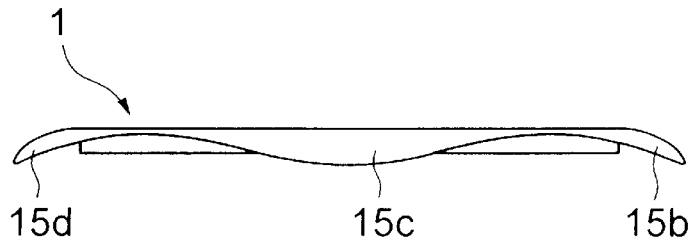
FIG. 2C is a side view of the disk storage case in FIG. 2A.
Figure 3A:
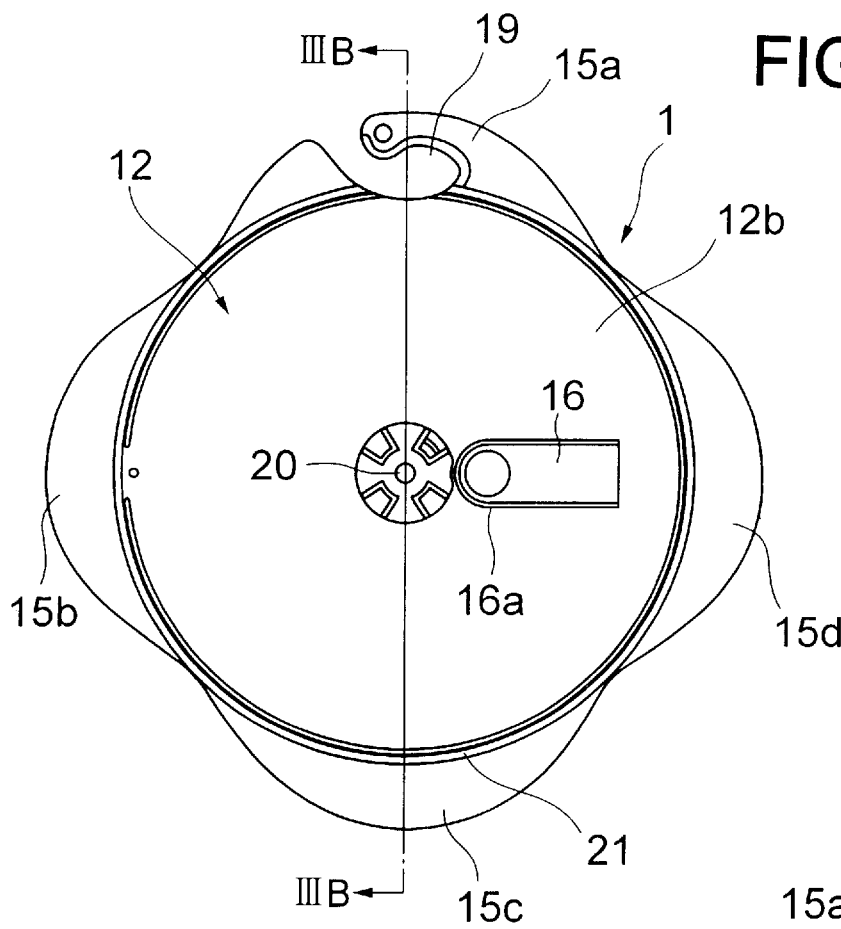
FIG. 3 is a rear view showing a disk storage case in FIG. 1.
FIG. 3B is a sectional view taken along the line IIIB—IIIB in FIG. 3A.
Figure 3B:
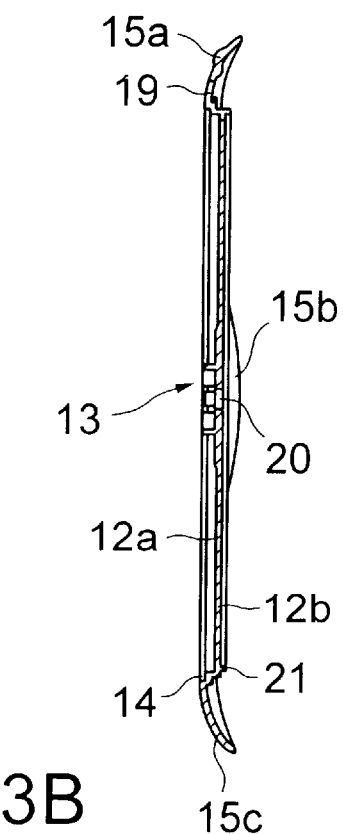

The disk holding portion 13 is, as illustrated in FIG. 1 and FIG. 7, provided so as to be substantially perpendicular to the setting face 12a, in which a plurality of nail parts 13a and a plurality of projections 13b are annularly arranged in division to make one after the other.

Figure 4:
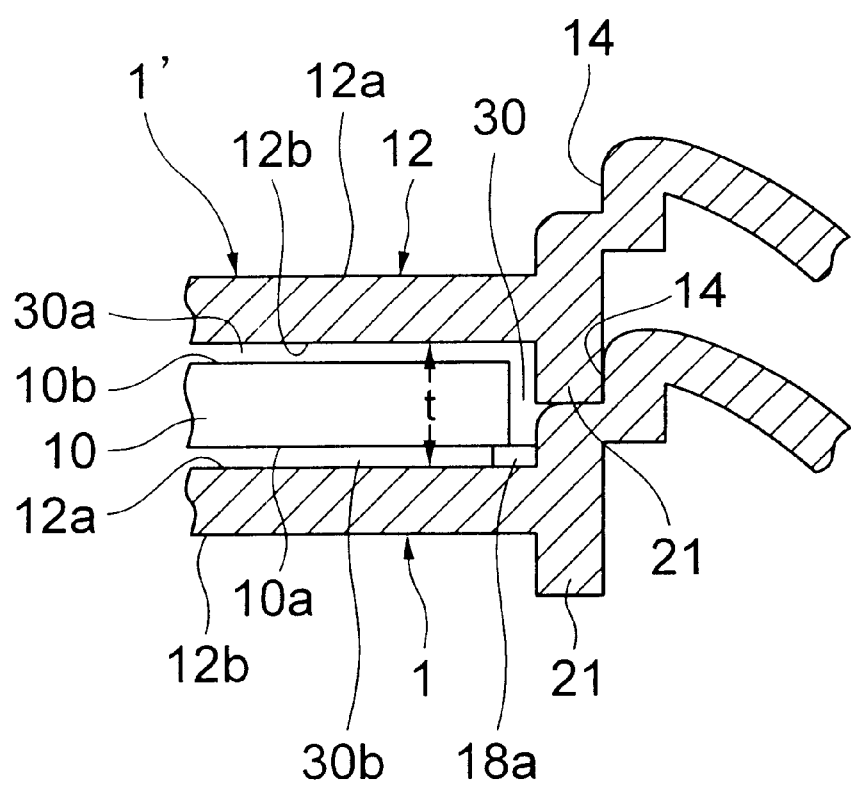
FIG. 4 is a vertical sectional view near the fitting portion of the disk storage case.

The setting portion 12 is formed to provide, the projection 17 having thin width and substantially circularly projecting slightly from the setting face 12a at a circumference of the holding portion 13, and the projections 18a, 18b, 18c and 18d arranged at the exterior of a setting face 12a, extending slightly in a radius direction, and having height of substantially same as that of the projection 17. As shown in FIG. 4, when a compact disk 10 is set on the setting face 12a, a space 30b is made between the under face 10a and the setting face 12a, and entire of the under face 10a is separated from the setting face 12a and does not contact with the face. The circular projection 17 contacts with near the center hole of the under face 10a of the compact disk 10, and the projections 18a to 18d contacts with an exterior of under face 10a. Accordingly, in case that the under face 10a is a face having a region for writing or reading an information in the compact disk 10, since each contacting portion of the projections 17 and 18a to 18d are out of the region, there is no risk to have an adverse affect in the under face 10a having the region for writing an information in the compact disk 10 and for others, caused by contacting.

By provision of the projections 18a to 18d, when the compact disk 10 is set on the setting face 12a, the compact disk 10 is prevented from slanting, and is guided to a predetermined position. When the compact disk is being stored in a condition as shown in FIG. 4, and if the disk storage case is loaded vertically in reference to FIG.4, the under face 10a is effectively prevented from contacting with the setting face 12a.

In addition, on the back face 12b of the setting portion 12, a cylindrical projection 21 is provided, which may be fitted into the stepped portion 14 of the setting face 12a. Onto the disk storage case 1, by fitting the projection 21 into the stepped portion 14, it is possible to stack a plurality of disk storage cases 1.

Every four (4) of nail parts 13a and the projections 13b of disk holding portion 13 are arranged circularly. The nail part 13a has, a diameter of which upper is slightly more than lower, and by provision of the notches 13c arranged beside the nail parts 13a on the setting face 12a, it is formed to make a possibility of elastic deformation. By such a formation, it makes possible to set the compact disk onto and to take off it from the disk holding part 13, and furthermore, the set compact disk may be stored in the disk storage case without fail to come out easily. The circularized projections 13b arranged between the nail parts 13a, are formed so as to be smaller in diameter and higher in height than those of the nail part 13a, and makes it easy to set a compact disk since it has a function for positioning when the compact disk is set.

In case that the compact disk is stored in the disk storage case 1, and when the compact disk is to be taken out, through pushing the deformable part 16 with finger from a side of the back face 12b, and by resultant pushing the compact disk up to the side of setting face 12, the compact disk may easily be taken out.

Figure 5A:
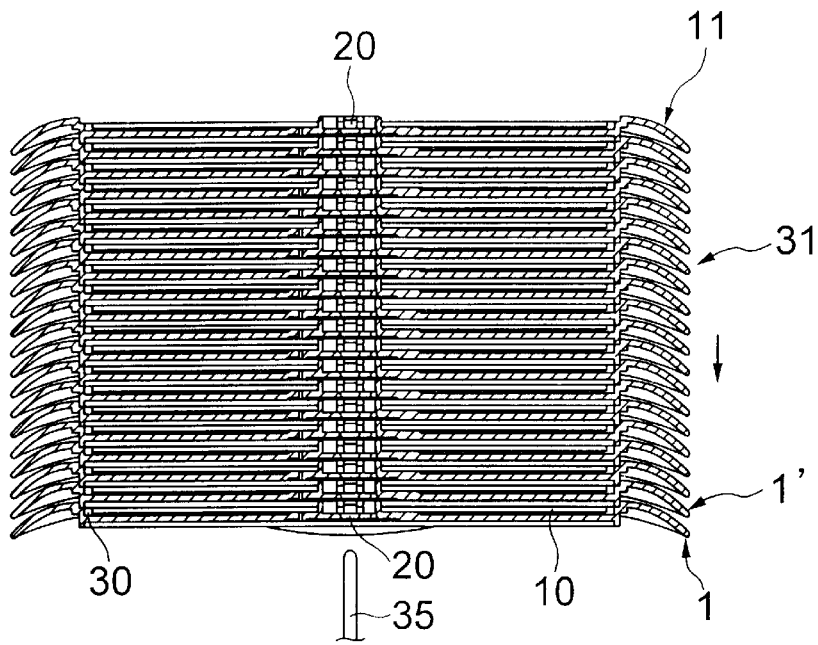
FIG. 5A, FIG. 5B and FIG. 5C are views schematically showing a production steps of producing the package in which a plurality of disk storage cases in FIG. 1 are stacked and packaged.
Figure 5B:
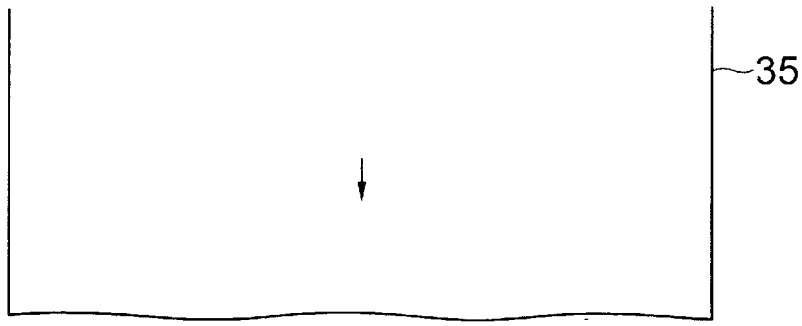
Figure 5C:
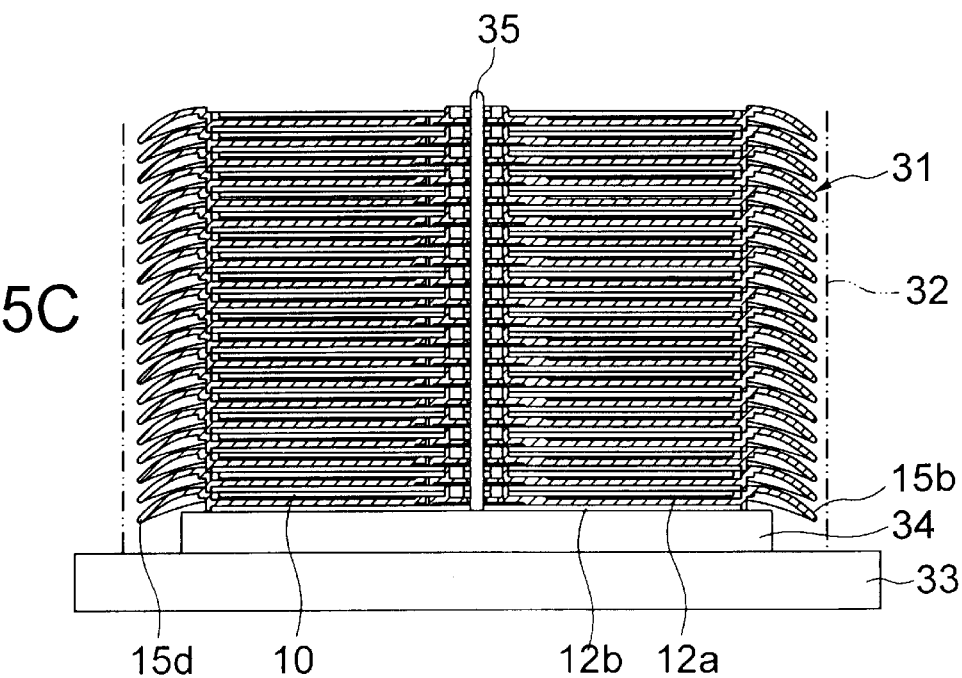
Figure 6:
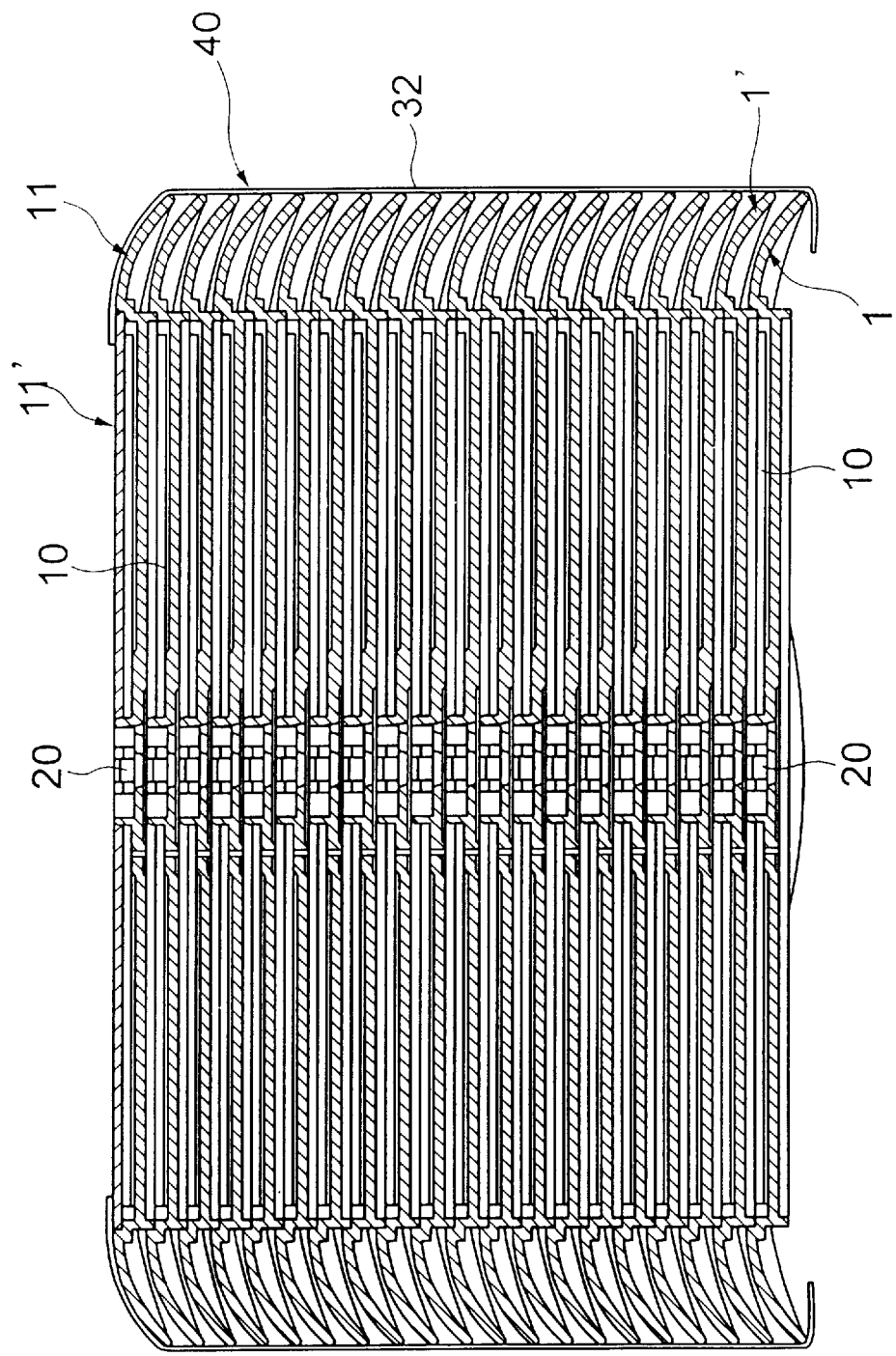
FIG. 6 is a side view of the package produced by the production steps shown in FIG. 5A to FIG. 5C.

Given next is an explanation of production method for a package with reference to FIG. 4 and FIG. 5A to FIG. 5C in case that the compact disks such as CD-R are to be set in the disk storage case 1 for commercializing, and when a plurality of disks, for example, twenty (20) disk storage cases, are to be packaged as shown in FIG. 6.

After setting the compact disk onto the disk storage case 1 shown in FIG. 1, as shown in FIG. 5A, other disk storage case 1, which is same one of the above and onto which a compact disk is also set, is stacked on the disk storage case 1. In this case, as shown in FIG. 4, by fitting the projection 21 of the other disk storage case 1' into the stepped portion 14 of the disk storage case 1, the disk storage case 1 is connected to the other disk storage case 1' without fail. At the same time, a space 30 is made between the setting face 12a of disk storage case 1 and the back face 12b of the adjacent other disk storage case 1', and the space 30 keeps a constant distance t due to fitting of the projection 21 into the stepped portion 14, and the distance t will be more than the thickness of the compact disk.

As shown in FIG. 4, between the under face 10a of the compact disk 10 and the setting face 12a, a space 30b is made due to presence of the projection 17 and the projections 18a to 18d, and entire of the under face 10a does not contact with the setting face 12a, accordingly. Due to this condition, the under face 10a of the compact disk 10 can be protected. A space 30a is also made between the upside face 10b of the compact disk 10 and the back face 12b of the adjacent other disk storage case 1'. Accordingly, when the compact disk 10 is stored in the disk storage case 1, even in case that a face having a region to write or read an information is set so as to be the under face 10a and a face having a label or others is set so as to be the upside face 10b, or vice versa, the face 10a and 10b can be protected due to no contacting with the disk storage case.

Next, in the same way to the above, by stacking the disk storage cases one after another, in which the compact disks are set, the stacking body 31 of a plurality of the disk storage case are stacked is made as illustrated in FIG. 5A. Then, as shown in FIG. 6, a cover 11, on which an information of commodity and others are printed, is to be fitted into the stepped portion 14 of the disk storage case 11 put on the top to cover. A through hole 20 of each disk storage case is, since it is located at a center, vertically aligned through the stacking body 31 in reference to FIG. 5A.

The compact disk 10 is individually stored in each disk storage case of the stacking body 31, however, the compact disk 10 is not stored in the disk storage case put on top.

Next, the pedestal 33 is, as shown in FIG. 5C, formed so that a spacer member 34 is arranged on the pedestal 33 and a rod-like member 35 is vertically fixed to the spacer member 34. The stacking body 31 is inserted into the rod-like member 35 of the pedestal 33 through the through hole 20. In this case, the insertion is easily performed since each through hole 20 is aligned in the stacking body 31.

In next step, heat shrinkable film 32 shown in FIG. 5B is wound cylindrically around the stacking body 31 on the pedestal 33 as shown by alternate long and tow short dashes line in FIG. 5C.

In next step, by supplying hot air onto a circumference of the stacking body 31 around which the heat shrinkable film 32 are wound as shown in FIG. 5C, the heat shrinkable film 32 is to be contacted closely with the circumference of the stacking body 31 due to contraction of it. After then, the stacking body 31 is pulled out of the rod-like member 35 of the pedestal 33. In such a way, as shown in FIG. 6, by close contacting of the heat shrinkage film 32 with a circumference of the stacking body 31, it is able to obtain the package 40 in which a plurality of disk storage case are packaged.

As mentioned above, for the film packaging of a plurality of disk storage cases, in consideration of not only production but also handling, it is preferable to utilize a manner that the cylindrical heat shrinkable film is to be wound around and contracted using hot air. However, conventionally, since it was difficult to supply a hot air uniformly in a step of film packing, and due to the resultant condition that a shrinkage amount was not same depend upon the position, a plurality of disk storage cases stacked were sometimes dislocated and tilted as a whole, and sometimes the disk storage cases were deformed, and such condition made a difficulty for packaging of a plurality of disk storage cases, or, the stored compact disks were sometimes contacted with the disk storage cases easily. But, according to the production method with the embodiments of the present invention, by inserting the rod-like member 35 on pedestal 33 into the through hole 20 of the stacking body 31, each disk storage member of the stacking body 31 is strictly supported and is not dislocated, so it can be made easy to wind the heat shrinkage film 32 therearound. Furthermore, the stacking condition of the stacking body 31 can be kept even if the heat shrinkage film is partially contracted in supplying of hot air, and it may therefore prevent a plurality of disk storage cases stacked from tilting or the disk storage cases from deformation. Accordingly, the package packing a plurality of disk storage cases in which the compact disk is individually stored, may effectively be produced without fail.

When it is in a condition that the stacking body 31 is inserted into the rod-like member 35 on the pedestal 33, since each disk storage case of the stacking body 31 is kept in stable, operation efficiency may greatly be improved when a plurality of disk storage cases are moved from a step to other step.

Furthermore, when a plurality of disk storage cases are stacked, by inserting the disk storage case into the rod-like member 35 on the pedestal 33 one by one, an operation itself to provide the stacking body 31 may be made to easy, and an effective result such as a good yield and a reduction of production steps may be obtained.

Since the spacer member 34 is, formed such that the diameter is less than a maximum diameter of the disk storage case 1, including the holding portion 15a to 15d shown in FIG. 1, as illustrated in FIG. 5C and FIG. 6, the holding portion 15a to 15d are projected over an exterior of the spacer member 34, and the film 32 may be wound around so as to cover the under face of the drawing, of the holding portion 15a to 15d. More to explain, the spacer member 34 may be omitted, and in this case, it is preferable to make the diameter of the pedestal 33 small in a same manner.

Figure 7A:
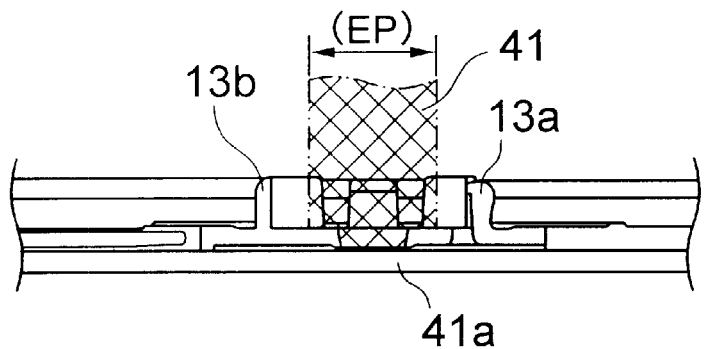
FIG. 7A, FIG. 7B and FIG. 7C are views respectively showing a structure of a mold for forming a through hole of the disk storage cases shown in FIG. 1.
Figure 7B:
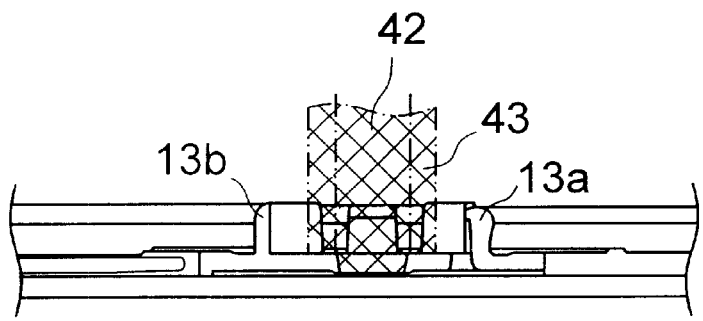
Figure 7C:
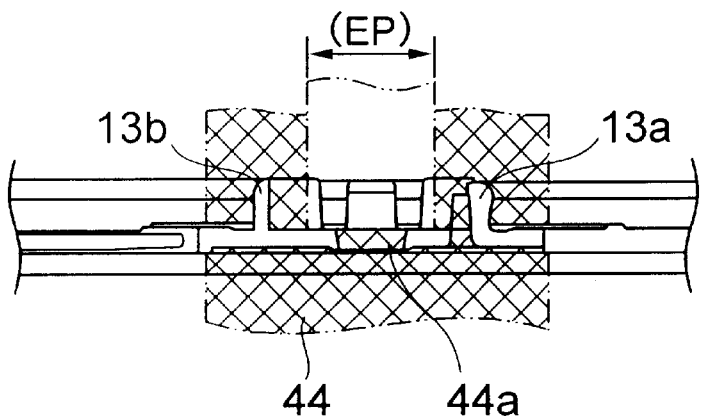

Given next is an explanation for a structure of molding mold to mold the through hole 20 and an adjacent area of the disk storage case 1 shown in FIG. 1 with reference to FIG. 7A, FIG. 7B and FIG. 7C. An example shown in FIG. 7A is for molding the through hole 20 with a tip part 41a of a mold pin 41 shown by hatching. The tip part 41a has a slight slant for prevention from making an undercut.

An example shown in FIG. 7B is for molding the through hole 20 with a fixed pin 42 arranged in a sleeve pin 43 shown by hatching.

An example shown in FIG. 7C is for molding the through hole 20 with a tip part 44a of a mold 44 shown by hatching. The tip part 44a has a slight slant for prevention from making an undercut.

As mentioned above, though embodiments of the present invention was explained, the present invention is not limited to these embodiments, but also it may be modified within the scope of the present invention. For example, the disk-like members to be stored in the disk storage case may be, not only information recording media such as CD, CD-R, CD-RW and CD-ROM, but also other information recording media such as MO, MD and DVD, and further, may be disk-like products other than information recording media. It may be provided such that the stepped portion of disk-like member is at the side of the back face, and the projected parts are at the side of the setting face. In addition, it is explained to provide four (4) projected parts at an exterior of the setting face, however, the number of the parts may be less than or more than four (4). It is also explained to provide four (4) grip portions, however, they may also be provided as less than or more than four (4).

What is claimed is:

1. A disk storage case comprising:
   a circular setting portion having an outer circumferential edge for setting a disk-like member thereon;
   a disk holding portion arranged vertically and annularly at a center of a setting face on the setting portion for holding the disk-like member;
   a first fitting portion substantially concentric with the circular setting portion, comprising a stepped portion or a projected portion; and
   a second fitting portion substantially concentric with the circular setting portion, comprising a stepped portion or a projected portion;
   wherein the first fitting portion is provided substantially along the outer circumferential edge of the setting portion, the second fitting portion is provided substantially along the outer circumferential edge of the setting portion, wherein when one fitting portion comprises a stepped portion, the other fitting portion comprises a projected portion and wherein when one fitting portion comprises a projected portion, the other fitting portion comprises a stepped portion, and wherein when a plurality of disk storage cases are stacked, the first fitting portion of a first disk storage case is fitted in a second fitting portion of an adjacent disk storage case.

2. A disk storage case according to claim 1, wherein the first fitting portion comprises a stepped portion formed at the exterior of the setting face, and the second fitting portion comprises a projected portion formed at the back face of the setting face.

3. A disk storage case according to claim 1, wherein when the plurality of disk storage cases are stacked whereby the first fitting portion of the first disk storage case is fitted in the second fitting portion of the adjacent disk storage case, a distance between the setting face of the first disk storage case and the back face of the adjacent disk storage case is more than a thickness of the disk-like member.

4. A disk storage case according to claim 1, wherein projections are provided on the setting face so as to prevent an entire face of the disk-like member from contacting with the setting face.

5. A disk storage case according to claim 1, further comprising a grip portion extending from a circumference of the setting portion such that the disk storage case may be gripped.

6. A disk storage case according to claim 5, further comprising a hook portion provided by notching a part of the grip portion so as to hang the disk storage case.

7. A disk storage case according to claim 1, further comprising an easily deformable portion formed in the setting portion such that a part of the setting face is easily deformed by pushing the back face with finger so as to release the disk-like object from engagement about the annular holding portion.

8. A disk storage case comprising:
   a circular setting portion comprising a back setting face and a front setting face for setting a disk-like object thereon wherein the front setting face comprises projections which prevent the disk-like object from contacting the front setting face, the front setting face and the back setting face each having an outer circumferential edge;
   a disk-like object holding portion arranged vertically and annularly at a center of the front setting face for holding the disk-like object; and wherein the circular setting face comprises an easily deformable tab which, when pressed from the back setting face, will release the disk-like object from engagement about the annular holding portion;
   four pedal-shaped grip potions extending from and evenly-spaced along the circumferential edge of the circular setting portion wherein one of the grip potions is notched so as to allow the disk storage case to be hung;
   a stepped fitting portion substantially concentric with the circular setting portion and provided substantially along the outer circumferential edge of the front setting face; and
   a projected fitting portion substantially concentric with the circular setting portion and provided substantially along the outer circumferential edge of the back setting face; wherein when a plurality of disk storage cases are stacked, the stepped fitting portion of a first storage case is fitted in the projected fitting potion of an adjacent disk storage case.

9. The disk storage case according to claim 1, wherein the first fitting portion is provided coextensive with substantially the entire outer circumferential edge of the setting portion.

10. The disk storage case according to claim 1, the second fitting portion is provided coextensive with substantially the entire outer circumferential edge of the setting portion.

11. The disk storage case according to claim 1, wherein the circular setting portion further comprises:
   a top surface;
   a bottom surface opposite the top surface; wherein the first fitting portion is coextensive with the outer circumferential edge of the setting portion on the top surface and the second fitting portion is coextensive with the outer circumferential edge of the setting portion on the bottom surface.

12. The disk storage case according to claim 1, wherein the circular setting portion further comprises:
   a top surface;
   a bottom surface opposite the top surface; wherein the first fitting portion is coextensive with the outer circumferential edge of the setting portion on the bottom surface and the second fitting portion is coextensive with the outer circumferential edge of the setting portion on the top surface.

* * * * *